(12) United States Patent
Brandon et al.

(10) Patent No.: US 7,735,739 B1
(45) Date of Patent: Jun. 15, 2010

(54) HAND SCANNER CORDLESS ADAPTER

(75) Inventors: John E. Brandon, San Rafael, CA (US); Michael L. Gifford, San Leandro, CA (US)

(73) Assignee: Socket Mobile, Inc., Newark, CA (US)

( * ) Notice: Subject to any disclaimer, the term of this patent is extended or adjusted under 35 U.S.C. 154(b) by 134 days.

(21) Appl. No.: 11/217,790

(22) Filed: Aug. 31, 2005

Related U.S. Application Data

(63) Continuation-in-part of application No. 11/082,190, filed on Mar. 16, 2005, now Pat. No. 7,429,000.

(60) Provisional application No. 60/606,650, filed on Sep. 2, 2004, provisional application No. 60/554,080, filed on Mar. 17, 2004.

(51) Int. Cl.
*G06K 7/10* (2006.01)
(52) U.S. Cl. .................... 235/472.01; 235/441
(58) Field of Classification Search ............ 235/462.14, 235/462.45, 472.01–472.03, 441, 462.43, 235/462.47, 462.01, 462.03
See application file for complete search history.

(56) References Cited

U.S. PATENT DOCUMENTS

| | | | | |
|---|---|---|---|---|
| 5,371,348 A | * | 12/1994 | Kumar et al. | 235/472.02 |
| 5,382,779 A | * | 1/1995 | Gupta | 235/383 |
| 5,479,001 A | * | 12/1995 | Kumar | 235/472.02 |
| 5,496,992 A | * | 3/1996 | Madan et al. | 235/472.02 |
| 5,825,009 A | * | 10/1998 | Schmid et al. | 235/462.01 |
| 5,828,052 A | * | 10/1998 | Reynolds et al. | 235/472.01 |
| 5,992,747 A | * | 11/1999 | Katoh et al. | 235/462.43 |
| 6,783,071 B2 | * | 8/2004 | Levine et al. | 235/462.13 |
| 7,080,788 B2 | * | 7/2006 | Koenck et al. | 235/472.01 |
| 2003/0001018 A1 | * | 1/2003 | Hussey et al. | 235/472.01 |

* cited by examiner

*Primary Examiner*—Seung H Lee
(74) *Attorney, Agent, or Firm*—PatentVentures; Bennett Smith; Korbin Van Dyke

(57) ABSTRACT

A wireless adapter combined with a conventional hand scanner, forms a wireless hand scanner combination. The wireless adapter captures the hand scanner via a retention mechanism. A plug is mounted within the wireless adapter, such that the plug mates with a receptacle of the hand scanner at the same time that the hand scanner is captured by the wireless adapter. The wireless adapter further includes Control, I/O, and Power Circuitry, a Wireless Module, a Battery, and one or more indicator(s). The Control, I/O, and Power Circuitry is adapted to communicate with the scan electronics of the hand scanner via a conventional industry standard I/O interface. These communications are conveyed to a computing host via the Wireless Module, which is adapted to be compatible with at least one wireless industry standard, including such wireless standards as Bluetooth, WiFi, UWB, and Zigbee. The indicator(s) is (are) adapted to provide scan feedback to the operator via at least one of auditory or visual means.

9 Claims, 4 Drawing Sheets

HAND SCANNER CORDLESS ADAPTER

CROSS REFERENCE TO RELATED APPLICATIONS

This application claims the benefit of U.S. Provisional Application Ser. No. 60/606,650, filed Sep. 2, 2004, by Jack Brandon et al., and entitled HAND SCANNER CORDLESS ADAPTER; this application is also a continuation-in-part of U.S. application Ser. No. 11/082,190, filed Mar. 15, 2005, by Leonard Ott et al. and entitled CORDLESS HAND SCANNER WITH IMPROVED USER FEEDBACK, which claims the benefit of U.S. Provisional Application Ser. No. 60/554,080, filed Mar. 17, 2004, also by Leonard Ott et al. and entitled CORDLESS HAND SCANNER WITH IMPROVED USER FEEDBACK; and wherein the foregoing applications are incorporated by reference for all purposes.

BACKGROUND

1. Field

Advancements in scanners held by an operator during use are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

DETAILED DESCRIPTION

A detailed description of one or more embodiments of the invention is provided below along with accompanying figures that illustrate the principles of the invention. Some of the embodiments or variations thereof may be characterized as "notable." The invention is described in connection with the embodiments, which are understood to be merely illustrative and not limiting. The invention is expressly not limited to or by any or all of the embodiments herein (notable or otherwise). The scope of the invention is limited only by the claims appended to the end of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Figure 1:
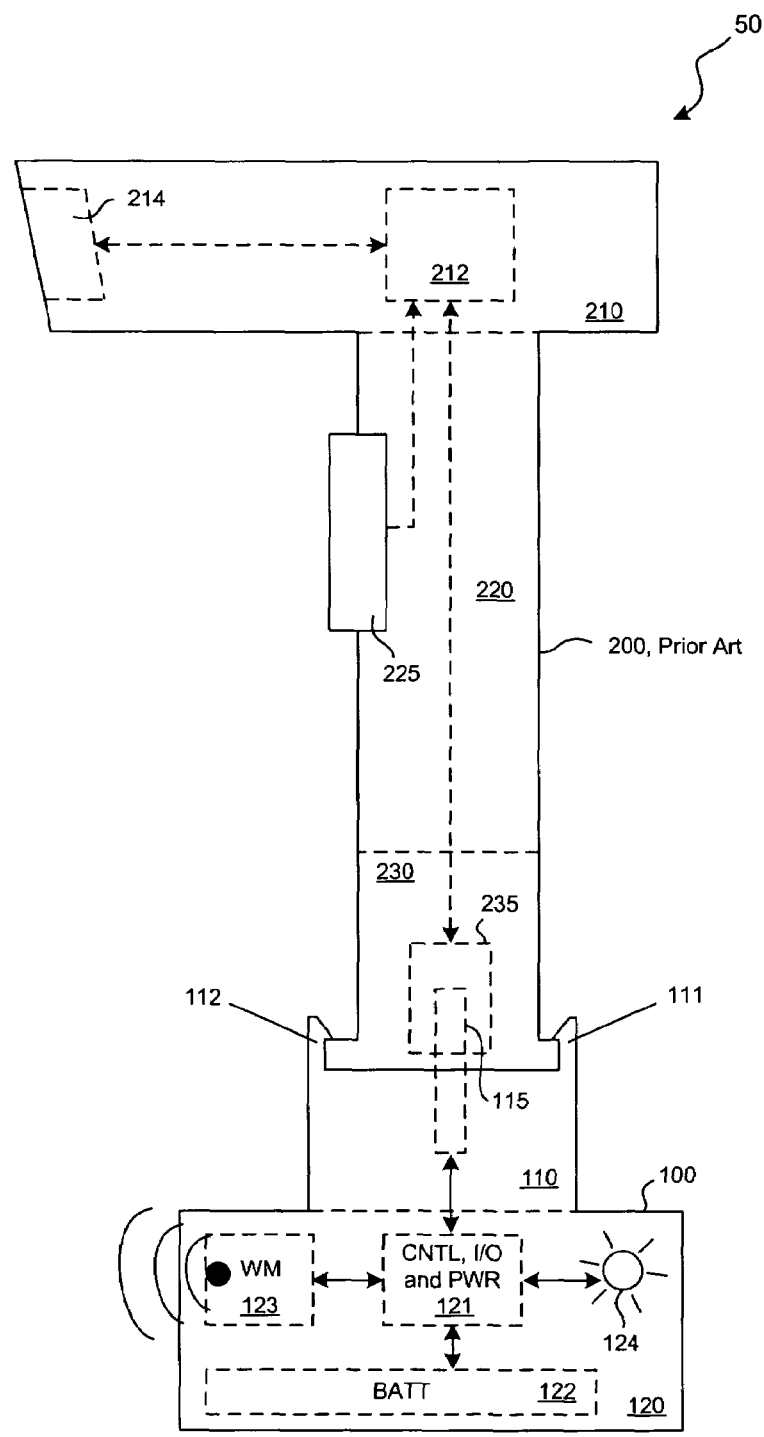
FIG. 1 illustrates a wireless hand scanner 50, formed by the combination of hand scanner 200 and wireless adapter 100, using a first wireless adapter form factor and a first retention mechanism.

As shown in FIG. 1, wireless hand scanner combination 50 is formed from the combination of a conventional hand scanner 200 (adapted originally for wired use) with wireless adapter 100. Wireless adapter 100 (also shown in isolation in FIG. 2) is adapted to receive the hand grip butt 230 of the hand scanner 200 and captures the hand scanner 200 via a variety of retention mechanisms. In a first embodiment, the retention mechanism is implemented with flexible retention guides (111 and 112 of FIG. 1). The retention guides permit the hand grip butt to be readily push-snapped into place such that the bottom of hand grip butt 230 is inserted into and captured by the wireless adapter 100. Plug 115 is mounted within wireless adapter 100, such that it mates with receptacle 235 at the same time that hand grip butt 230 is captured by the wireless adapter 100.

The wireless adapter 100 further includes Control, I/O, and Power Circuitry 121, Wireless Module 123, Battery 122, and indicator(s) 124. Control, I/O, and Power Circuitry 121 is adapted to communicate with scan electronics 212 of hand scanner 200 via a conventional industry standard I/O interface. These communications are conveyed to a computing host via wireless module 123. Wireless module 123 is adapted to be compatible with at least one wireless industry standard, including such wireless standards as Bluetooth, WiFi, UWB, and Zigbee. Indicator(s) 124 is adapted to provide scan feedback to the operator via at least one of auditory or visual means.

ILLUSTRATIVE COMBINATIONS

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A wireless adapter for a hand scanner having a first I/O connector for communicating with a computing host, the adapter comprising: a second I/O connector adapted to mate directly with the first I/O connector; I/O circuitry coupled to the second I/O connector; a wireless module coupled to the I/O circuitry and adapted to communicate with the computing host; and a housing containing at least in part the I/O connector, the I/O circuitry, and the wireless module; wherein the housing is adapted to mechanically attach with the hand scanner and the first and second I/O connectors mate when the housing is attached to the hand scanner; the hand scanner communicating with the computing host via the first I/O connector, the I/O circuitry, and the wireless module.

The foregoing wireless adapter wherein the wireless adapter forms a base, such that when the base is positioned on a horizontal planar surface, the hand grip of the hand scanner is held vertical.

The foregoing wireless adapter wherein the housing includes a retention mechanism for capturing a portion of the hand scanner.

The foregoing wireless adapter wherein the retention mechanism includes at least one flexible guide, the hand scanner snapping past the at least one guide and being captured thereby.

The foregoing wireless adapter wherein the retention mechanism includes at least one retaining lip and at least one adjustable retaining surface, the hand scanner being held in place by a combination of the at least one retaining lip and the retaining surface.

The foregoing wireless adapter wherein the adjustable retaining surface includes a retaining screw.

The foregoing wireless adapter wherein the wireless module is adapted to be compatible with at least one wireless industry standard from the set of wireless industry standards including Bluetooth, WiFi, UWB, and Zigbee.

The foregoing wireless adapter wherein the I/O circuitry is compatible with at least one serial communications industry standard from the set of serial communications industry standards including RS-232, RS-422, RS-485, and USB.

Simple Retention Mechanism Embodiments

FIG. 1 illustrates a wireless hand scanner 50, formed from the combination of hand scanner 200 attached to a wireless adapter 100, in accordance with a first embodiment. Hand scanner 200 includes scan head 210, hand grip 220, and hand grip butt 230. Scan head 210 includes scan transducer 214 and scan electronics 212, both coupled to be collectively compatible with at least one industrial standard for optical or RFID scanning. Grip 220 includes trigger switch 225, coupled to scan electronics 212 for initiating a scan. Hand grip butt 230 includes receptacle 235, adapted to receive a male plug for providing power and communications. In a first embodiment, receptacle 235 is an industry standard RJ-45 connector.

Wireless adapter 100, enables hand scanner 200, in isolation adapted to be a wired hand scanner, to be repurposed as a wireless hand scanner. Hand scanner 200 uses an RS-232 serial interface (within scan electronics 212) adapted to be coupled via a serial cable (plugged into receptacle 235) to a system unit, such as a point-of-sale terminal or computer. In FIG. 1, the serial cable is replaced by wireless adapter 100.

Wireless adapter 100 includes a top portion 110 and a bottom portion 120. Top portion 110 is adapted to receive the hand grip butt 230 of the hand scanner 200. Top portion 110 includes a retention mechanism to capture the hand scanner 200. In FIG. 1, the retention mechanism is implemented with flexible retention guides 111 and 112 of top portion 110. In the figures, top portion 110 is shown in cross section. Those skilled in the art will appreciate that the hand grip 220, the hand grip butt 230, and the top portion 110, may be cylindrical. Thus the flexible guides 111 and 112 may in fact be separate sections of a single circular part that acts both as a guide and a "snap" retaining ring. The retention guides permit the hand grip butt to be readily push-snapped into place such that the bottom of hand grip butt 230 is inserted into and captured by top portion 110. Plug 115 is mounted within wireless adapter 100, such that it mates with receptacle 235 at the same time that hand grip butt 230 is captured by top portion 110.

Figure 2:
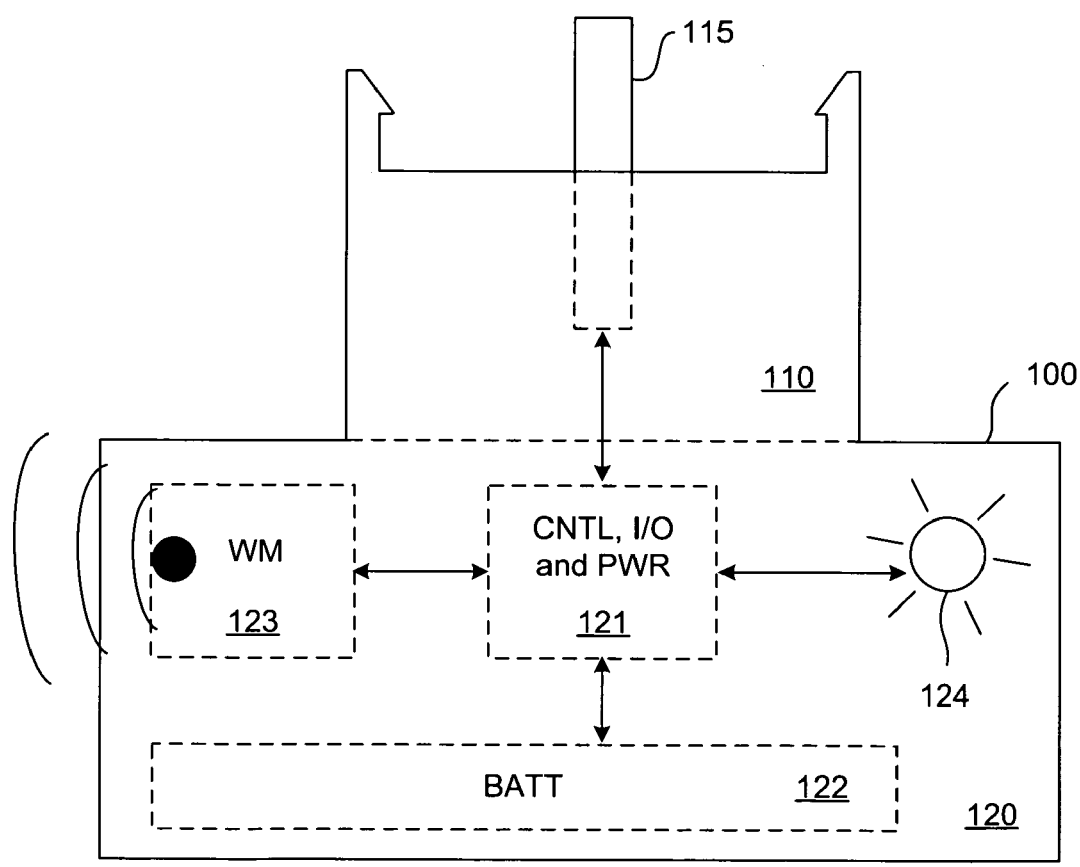
FIG. 2 illustrates the wireless adapter 100 of FIG. 1

FIG. 2 shows wireless adapter 100 by itself for greater clarity. Bottom portion 120 includes Control, I/O, and Power Circuitry 121, Wireless Module 123, Battery 122, and indicator(s) 124. Control, I/O, and Power Circuitry 121 is adapted to communicate with scan electronics 212 of hand scanner 200 via an RS-232 serial interface. These communications are conveyed to a system unit (such as a point-of-sale terminal or computer) via wireless module 123. Wireless module 123 is adapted to be compatible with at least one wireless industry standard, including such wireless standards as Bluetooth, WiFi, UWB, and Zigbee. Indicator(s) 124 is adapted to provide scan feedback to the operator via at least one of auditory or visual means. It will be understood that "indicator(s)" as used throughout this specification encompasses embodiments that have a single indicator (be it auditory or visual) and embodiments that have a plurality of indicators (auditory or visual in any combination, including but not limited to, one auditory indicator and one visual indicator, two auditory indicators, and two visual indicators).

The logic within Control, I/O, and Power Circuitry 121 is adapted to activate indicator(s) 124 to signal the operator that a good scan has registered. In a first embodiment the good scan condition is associated with scan electronics 212 indicating a good scan. In a second embodiment, the good scan condition is associated with the system unit indicating a good scan.

In a further notable embodiment, the indicator(s) are controlled in a manner described in further detail in the previously referenced U.S. application Ser. No. 11/082, 190. Specifically, the indicator(s) are set to a first (or pending) state when a scan is performed, and remain in the first state up until the time the host feedback is received. The indicator(s) are set to a second (or successful) state if the feedback indicates the host successfully received the scan data. The indicator(s) are set to a third (or failure) state if the feedback indicates the host failed to properly receive the scan data.

Compound Retention Mechanism Embodiments

Figure 3:
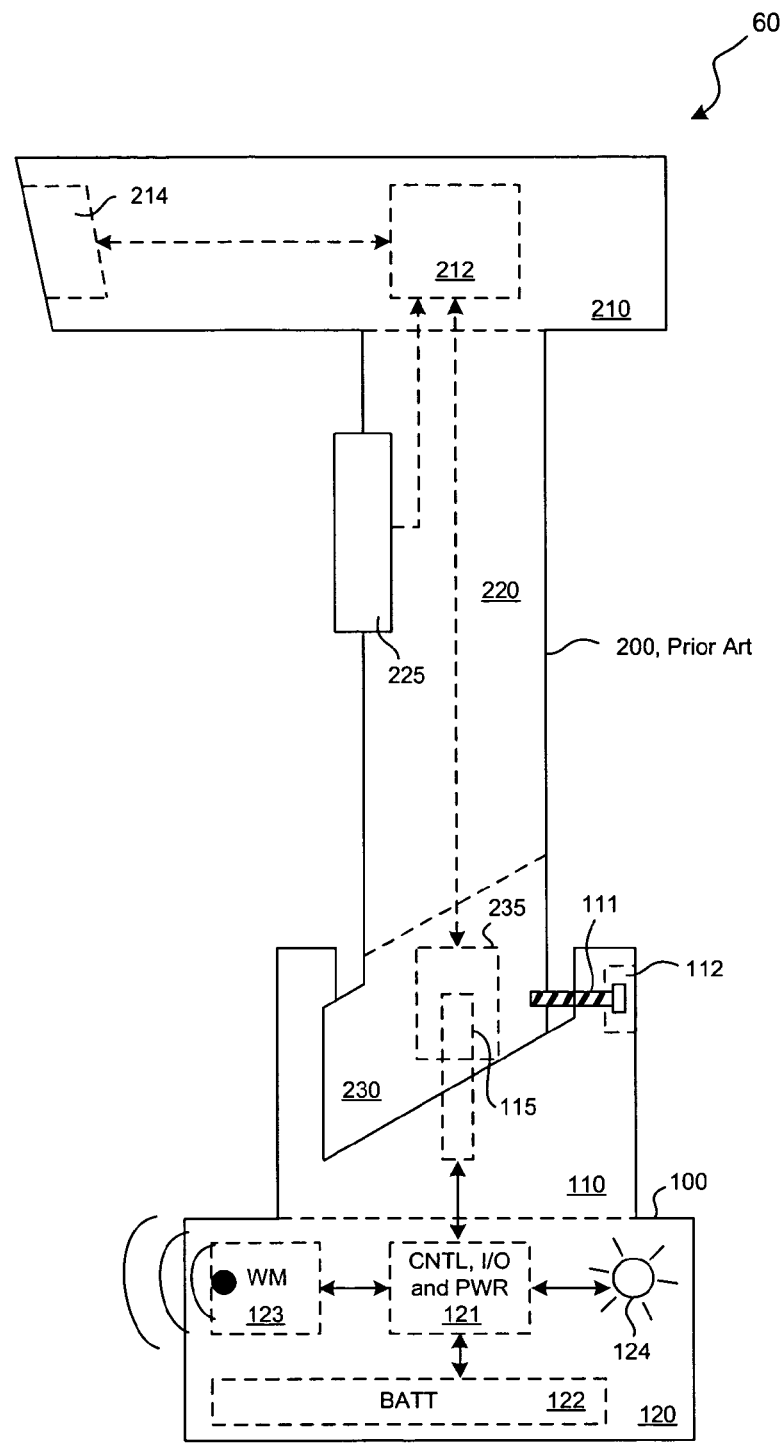
FIG. 3 illustrates a wireless hand scanner 60, formed by the combination of hand scanner 200 and wireless adapter 100, using the first wireless adapter form factor and a second retention mechanism.

FIG. 3 illustrates another embodiment, wireless hand scanner 60, in which a different retention mechanism is employed. In this embodiment, the forward portion of hand grip butt 230 is abutted against a rigid stop portion of top portion 110 and subsequently held in place by tightening screw 111, accessed via recess 112 to engage the rear portion of hand grip butt 230. Top portion 110 further includes plug 115 adapted to mate with receptacle 235 when hand scanner 200 is placed within wireless adapter 100. It will be appreciated that screw 111 is just one type of adjustable retaining surface. For example a simple clasp or latch mechanism could equivalently be used to retain the rear portion of hand grip butt 230.

In a first variation of the FIG. 3 embodiment, plug 115 is mounted within wireless adapter 100 via an intermediate flexible suspension (not explicitly shown, but well within the grasp of those skilled in the art), such that spring tension permits downward vertical displacement of plug 115 while hand scanner 200 is being mounted into final position within wireless adapter 100. Once the final placement of hand scanner 200 has been achieved, the spring tension returns the plug to the position shown for operative engagement with receptacle 235.

In a second variation of the FIG. 3 embodiment, plug 115 is simply attached to the end of a flexible cable with sufficient play to permit manual insertion of the plug into receptacle 235 during the mounting of hand scanner 200 with wireless adapter 100. Plug 115 is not otherwise mechanically coupled to top portion 110. A recess is provided within 110 of size sufficient to provide room for any excess cable.

In FIGS. 1 and 3, the weight and center of gravity of the combined wireless adapter 100 and scanner is designed to stand upright in a stable manner. That is, with the wireless adapter 100 acting as a base resting on a horizontal surface (such as a counter), the scanner is held with the hand grip 220 vertical such that the hand grip is readily grasped by the operator.

Hand Grip Extension Embodiments

Figure 4:
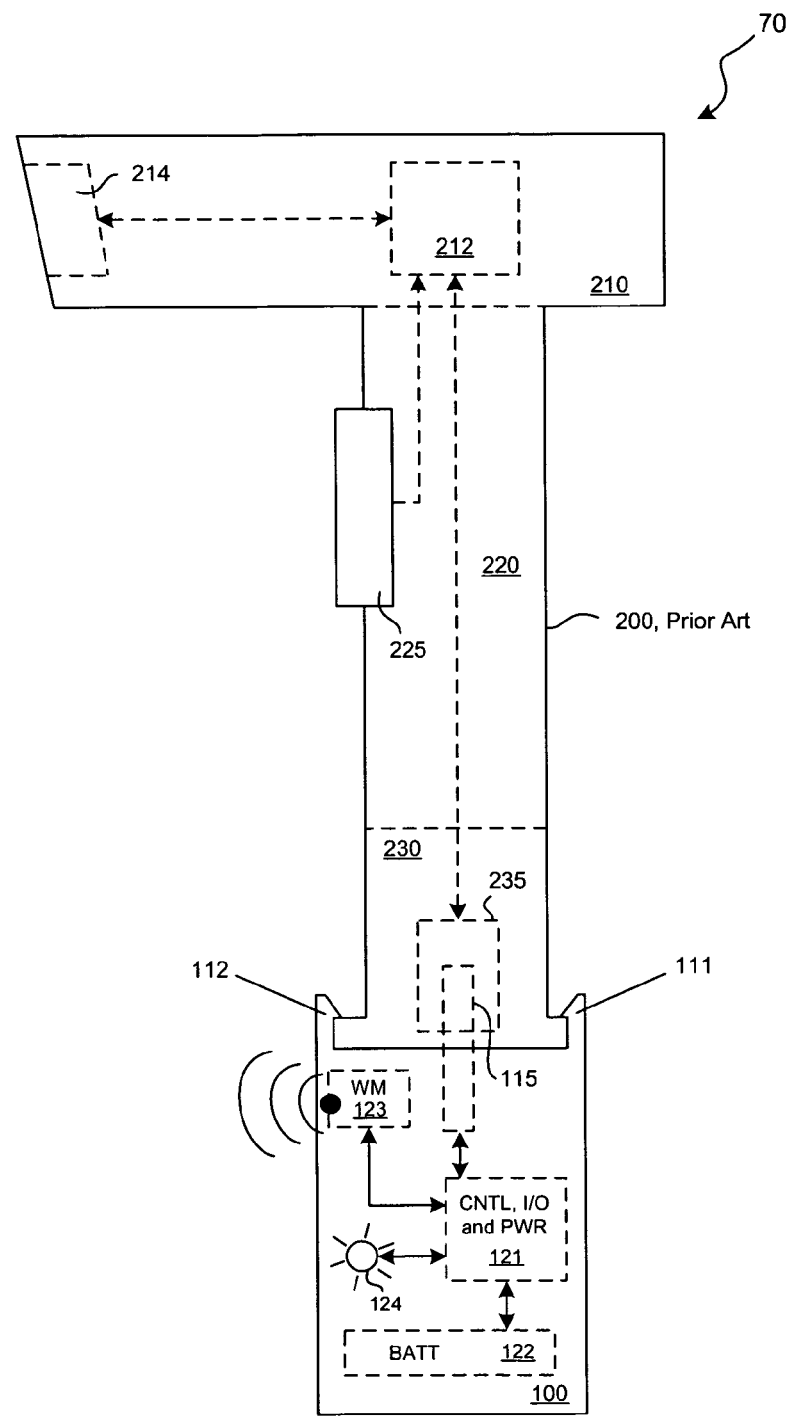
FIG. 4 illustrates a wireless hand scanner 70, formed by the combination of hand scanner 200 and wireless adapter 100, using a second wireless adapter form factor and the first retention mechanism.

FIG. 4 shows another embodiment, wireless scanner 70, to emphasize that other configurations of wireless adapter 100 are contemplated. In particular, in FIG. 4, the wireless adapter is designed with an esthetic priority on designing the wireless adapter 100 as an extension of the hand grip butt 230. In this manner a semblance of the original form factor of the hand scanner is largely maintained.

In variations with respect to all of the foregoing embodiments, it will be appreciated that the shape of hand grip butt 230 and top portion 110, may be arbitrarily irregular so long as portions of each have compatible similar shapes. In considering an arbitrary shape variation of FIG. 1 for example, top portion 110 is adapted to be of a shape suitable to accept the shape of hand grip butt 230 such that hand grip butt 230 is receivable into top portion 110. Hand grip butt 230 is retained either by snap action or in conjunction with at least one adjustable retaining surface (including but not limited to screw 111).

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The type of connectors and the type of wireless interface are likewise merely illustrative and are not limiting. Also, unless specifically stated to the contrary, the value ranges specified, the maximum and minimum values used, or other particular specifications (such as the quantity, type, and speed of processors and memory; interface bandwidths; the degree of redundancy for any particular component or module; the particular version of an interface standard or component; and the number of entries or stages in registers and buffers), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A wireless adapter for a hand scanner, the hand scanner being enabled for hand-held use by an operator and limited to wired communications with a computing host via a first I/O connector, the wired communications being in accordance with a serial I/O interface, the adapter comprising:

a second I/O connector enabled to removably mate directly with the first I/O connector;

I/O circuitry coupled to the second I/O connector and compatible with the serial I/O interface;

a wireless module coupled to the I/O circuitry and enabled to communicate with the computing host;

a housing containing at least in part the second I/O connector, the I/O circuitry, and the wireless module, the housing being enabled to mechanically removably attach to the hand scanner and removably mate the first and second I/O connectors when so attached;

wherein attachment of the adapter to the hand scanner enables the hand scanner to wirelessly communicate with the computing host so that the hand scanner is no longer limited to wired communications with the computing host; and wherein the housing comprises a retention mechanism for capturing a portion of the hand scanner, the retention mechanism comprising at least one retaining lip and at least one adjustable retaining surface, the hand scanner is held in place by a combination of the at least one retaining lip and the retaining surface, and the adjustable retaining surface enables accommodation of a variety of sizes and geometries of the captured portion of the hand scanner.

2. The wireless adapter of claim 1, wherein the hand scanner includes comprises a hand grip butt portion and when the adapter is attached to the hand scanner the housing of the adapter acts as an extension of the hand grip butt portion.

3. The wireless adapter of claim 1, wherein when the adapter is attached to the hand scanner the housing of the adapter acts as a mechanical base that may be positioned on a horizontal planar surface in a manner that a hand grip of the hand scanner is held vertical.

4. The wireless adapter of claim 1, wherein when the adapter is attached to the hand scanner the weight and center of gravity of the adapter and hand scanner combination is such that the combination can stand on a surface with a hand grip of the hand scanner positioned above and away from the surface and readily graspable by the operator.

5. The wireless adapter of claim 1, wherein the adjustable retaining surface comprises a retaining screw.

6. The wireless adapter of claim 1, wherein the adjustable retaining surface comprises a latch mechanism.

7. The wireless adapter of claim 1, wherein the adjustable retaining surface comprises a clasp mechanism.

8. The wireless adapter of claim 1, wherein the wireless module is compatible with at least one wireless industry standard from the set of wireless industry standards including those known as Bluetooth, WiFi, UWB, and Zigbee.

9. The wireless adapter of claim 1, wherein the serial I/O interface is compatible with at least one serial communications industry standard from the set of serial communications industry standards including RS-232, RS-422, RS-485, and USB.

* * * * *